United States Patent [19]
Ragaly

[11] Patent Number: 5,317,224
[45] Date of Patent: May 31, 1994

[54] ELECTRIC MACHINE WITH MEANS FOR GUIDING COOLING AIR SUPPLIED FROM OUTSIDE OF THE MACHINE

[75] Inventor: Istvan Ragaly, Schwieberdingen, Fed. Rep. of Germany

[73] Assignee: Robert Bosch GmbH, Stuttgart, Fed. Rep. of Germany

[21] Appl. No.: 849,431
[22] PCT Filed: Jan. 8, 1991
[86] PCT No.: PCT/DE91/00003
§ 371 Date: May 12, 1992
§ 102(e) Date: May 12, 1992
[87] PCT Pub. No.: WO91/11845
PCT Pub. Date: Aug. 8, 1991

[30] Foreign Application Priority Data
Feb. 3, 1990 [DE] Fed. Rep. of Germany ....... 4003155

[51] Int. Cl.$^5$ ............................................. H02K 9/02
[52] U.S. Cl. .......................................... 310/58; 310/89
[58] Field of Search ................... 310/52, 55, 58, 59, 310/64, 60 R, 68 D, 89

[56] References Cited

U.S. PATENT DOCUMENTS

| | | | |
|---|---|---|---|
| 4,757,221 | 7/1988 | Kurihashi et al. | 310/58 X |
| 4,766,337 | 8/1988 | Parkinson et al. | 310/58 |
| 4,779,905 | 10/1988 | Ito et al. | 310/58 X |
| 5,194,770 | 3/1993 | Yoshioka et al. | 310/58 X |

FOREIGN PATENT DOCUMENTS

| | | |
|---|---|---|
| 0231785 | 8/1987 | European Pat. Off. |
| 726395 | 10/1942 | Fed. Rep. of Germany . |
| 896086 | 11/1953 | Fed. Rep. of Germany . |
| 180179 | 10/1969 | Fed. Rep. of Germany . |
| 1926256 | 11/1970 | Fed. Rep. of Germany . |
| 351895 | 5/1905 | France . |
| 162552 | 5/1921 | United Kingdom . |

Primary Examiner—William H. Beha, Jr.
Assistant Examiner—E. To
Attorney, Agent, or Firm—Michael J. Striker

[57] ABSTRACT

The electric machine, advantageously a generator, includes a machine housing with two end shields, a lamination bundle provided with a stator winding having winding heads and a rotor in the housing. To improve the cooling effect and reduce aerodynamic flow noise the machine housing is provided with at least one air guiding duct enclosing circularly at least one winding head on one side of the lamination bundle and the at least one air guiding duct is provided with at least one inlet opening and at least one outlet opening for cooling air to carry away heat dissipated during operation, and each of the at least one air guiding ducts is bounded exteriorly by one of the end shields of the machine housing and interiorly by one of the two annular walls inserted between the lamination bundle and the end shield bounding the at least one air guiding duct exteriorly.

10 Claims, 4 Drawing Sheets 12,317,224

ELECTRIC MACHINE WITH MEANS FOR GUIDING COOLING AIR SUPPLIED FROM OUTSIDE OF THE MACHINE

BACKGROUND OF THE INVENTION

The invention relates to an electric machine with means for guiding cooling air fed into the machine interior from the outside.

An electric machine of the above-described type is known having a machine housing including end shields, a lamination bundle carrying a stator winding with winding heads and received in the machine housing and a rotor also received in the machine housing so as to cooperate magnetically with the lamination bundle. The machine housing is provided with at least one inlet and outlet opening for cooling air from the exterior to carry away heat dissipated in the interior during operation of the machine.

In so-called dynamos in motor vehicles it is drive shaft of the generator which direct a flow of air through the machine to carry away the heat losses generated in the generator. The internal ventilators are arranged in such a way that the cooling air delivered by them flows outward over and past the winding heads, so that the heat layer around the winding heads is disrupted. This arrangement does improve the efficiency of the cooling compared with machines having external ventilators, but it poses problems with respect to aerodynamic noise in high-speed machines. To eliminate this problem, liquid-cooled generators have been used in which the housing surface at the stator, at the end shields and at the cooling bodies of the rectifier elements integrated in the generator are cooled with water or oil. The coolant is delivered by pumps and flows through ducts provided for this purpose at the surface of the machine, absorbs the heat losses, is cooled again and finally guided back to the pump. In most cases, this cooling circuit is a closed system which is completely sealed from the outside. The electrically conducting parts of the machine must be electrically insulated, particularly when water is used as coolant. However, the effectiveness of the cooling is substantially reduced by the insulating layer. Because of the expensive machining, the sealing which is required in great changes in temperature, and the necessary feeding and conducting away of the coolant, such systems are only used where no other possibility exists.

Finally, a separately cooled electric machine is known from DE 3303148 A1 in which inlet openings for the cooling air are provided on a front side and air outlet openings, from which the air heated by the heat losses of the machine escape, are provided on the opposite front side. The cooling air flows through the electric machine in the axial direction according to the laws of flow and escapes into the atmosphere. Because of narrow air gaps, sharp changes in cross section, and dead zones, a good cooling efficiency cannot be achieved in such cooling systems and, moreover, considerable aerodynamic noise also occurs in high-speed machines.

It is attempted with the solution according to the invention to improve the air guidance inside the machine in such a way that it flows as intensively as possible around the areas of the machine where most of the heat losses are generated.

SUMMARY OF THE INVENTION

It is an object of the present invention to provide an improved electric machine, which does not have the above-mentioned disadvantages.

These objects and others which will be made more apparent hereinafter are attained in an electric machine comprising a machine housing including two end shields, a lamination bundle provided with a stator winding having winding heads received in the machine housing between the end shields, and a rotor also received in the machine housing to cooperate magnetically with the lamination bundle.

According to the invention the machine housing is provided with at least one air guiding duct enclosing circularly at least one of the winding heads of the stator winding on one side of the lamination bundle and the at least one air guiding duct is provided with at least one inlet opening for admission of cooling air from the exterior and at least one outlet opening for expulsion of the cooling air to carry away heat dissipated during operation, and each of the at least one air guiding ducts is bounded exteriorly by one of the end shields of the machine housing and interiorly by an annular walls inserted between the lamination bundle and the end shield bounding it exteriorly.

The construction of the electric machine, according to the invention, has the advantage that annular air guiding ducts can be formed by simple measures at the winding heads of the machine, through which the cooling air can be steered without great changes in air resistance, e.g. because of turbulent flow from an inlet opening to an outlet opening, and the heat dissipated is carried off directly at the winding heads of the machine. The aerodynamic noise at the machine is considerably reduced because of the guiding of the cooling air flow which is determined in this way, especially since a pressure fan or compressed air unit which is driven at low speed by the combustion engine or electric motor can be provided outside the electric machine for generating the cooling air, the cooling air being guided via a cooling air hose to the electric machine with or without filtering. It is also possible to mount the pressure fan directly on the drive shaft of the machine, since the pressure fan can have a smaller diameter as a result of the improved cooling efficiency, which results in a reduction of the aerodynamic noise. Thus, in a three-phase generator for motor vehicles it is particularly advisable that the machine housing have two housing halves constructed as end shields which clamp the lamination bundle between them and have an annular groove in the area of the end shield on the inside. An annular wall defining the air guiding duct toward the rotor is inserted in this annular groove when assembling the machine. A cooling air guidance which is particularly advantageous for the efficiency of the cooling system is made possible in that the housing halves extend over the lamination bundle and form an air-tight air feed duct between the air guiding ducts arranged at the front. The housing halves are screwed together to form such an air feed duct. An air inlet connecting piece is advisably provided at one of the two housing halves at the outer circumference of the annular air guiding duct located there, the air feed duct leading away from the latter over the lamination bundle to the other annular air guiding duct. Insofar as a special ventilation of the rotor of the machine is required, the annular walls of the air guiding ducts received at the end shields can be advantageously provided with apertures for this purpose so as to direct a guided air flow to the rotor. In three-phase generators for motor vehicles heat losses also occur at rectifier diodes which are arranged on the front of the three-phase generator on cooling plates. At least one additional opening is advisably provided in the air guiding duct located on the same front side to carry away these heat losses so that the cooling plate of the rectifier diodes can be cooled by the cooling air exiting from there.

Since the winding heads of the stator winding are amo the chief heat sources of a generator, an effort should be made to surround the winding heads as closely as possible by the air guiding ducts so as to guide the delivered cooling air along the winding heads through narrowed portions of the cross section at high speed and without unnecessary throttling. It is advantageous for the cooling efficiency that the cooling air be divided at the air inlet opening of each air guiding duct and that it flow through a half of the annular air guiding duct and is then carried away via an air outlet opening located opposite the air inlet opening. The cooling air in the air guiding ducts can also be sucked through the machine by a vacuum unit. In this case it is advisable to arrange a vacuum connecting piece at the outer circumference of an air guiding duct on at least one of the two housing halves. The effectiveness of the cooling system can be further increased in that the air inlet opening and air outlet opening of the air guiding duct on one side of the machine are offset by 180° relative to those of the air guiding duct on the other side of the machine. Since the winding heads on both sides belong to the same stator windings, temperature differences in the individual windings of the stator are substantially reduced since the windings at the outlet of the warm air of the ventilating duct on one side are situated at the ventilating duct of the other side in the feed of the cool air. Finally, the cooling is further improved in that the air guiding ducts have two air inlet openings which are located opposite one another, two air outlet openings which are likewise located opposite one another being offset by 90° between the two opposite air inlet openings. In so doing, the cooling air is guided through only a fourth of the annular air guiding duct.

BRIEF DESCRIPTION OF THE DRAWINGS

The objects, features and advantages of the present invention will now be illustrated in more detail by the following detailed description, reference being made to the accompanying drawing in which.

DETAILED DESCRIPTION OF THE PREFERRED EMDODIMENT

Figure 1:
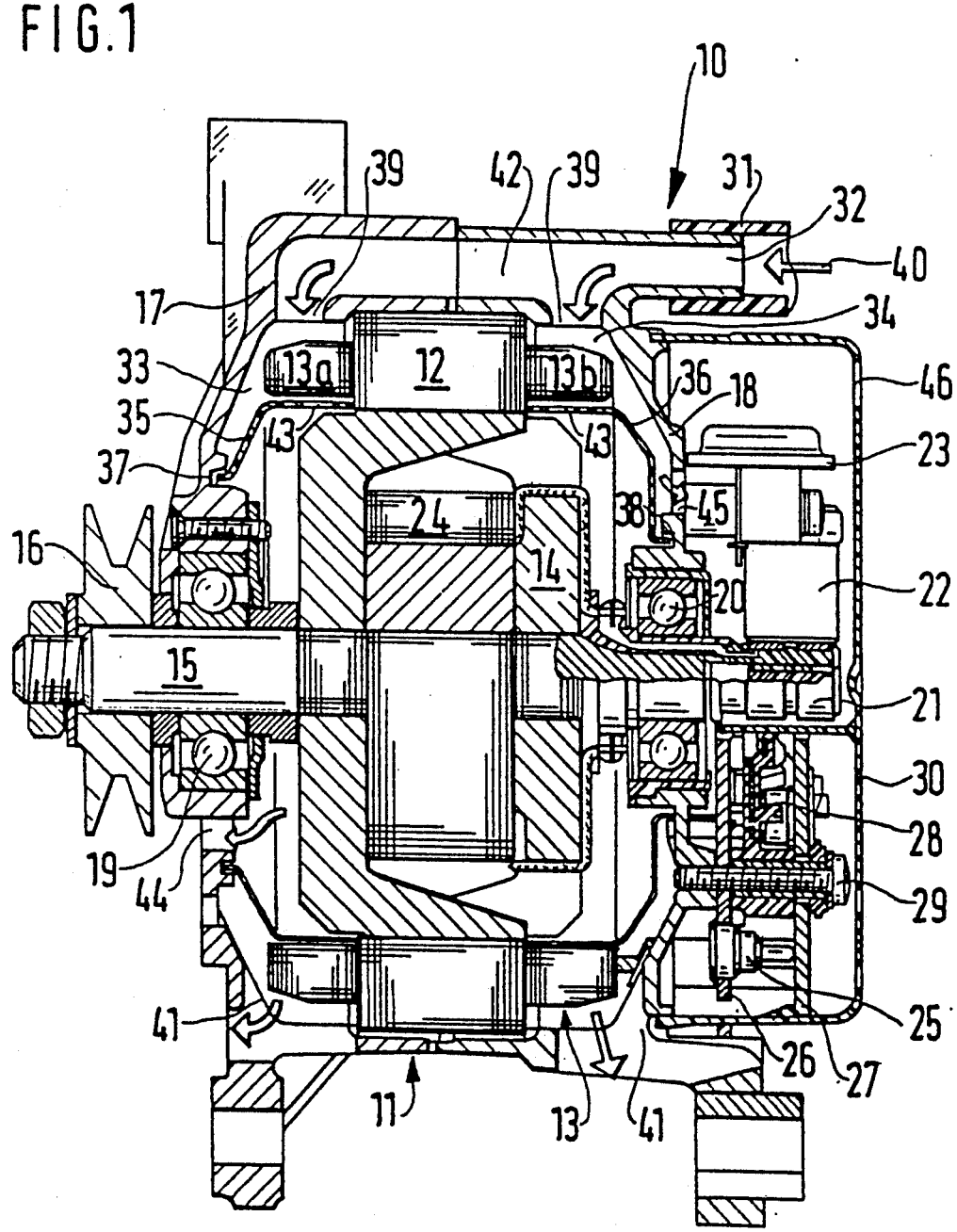
FIG. 1 is a cross-section view through one embodiment example of a three-phase generator for a motor vehicle provided with means for separate ventilation and guiding of cooling air according to the invention.
Figure 2:
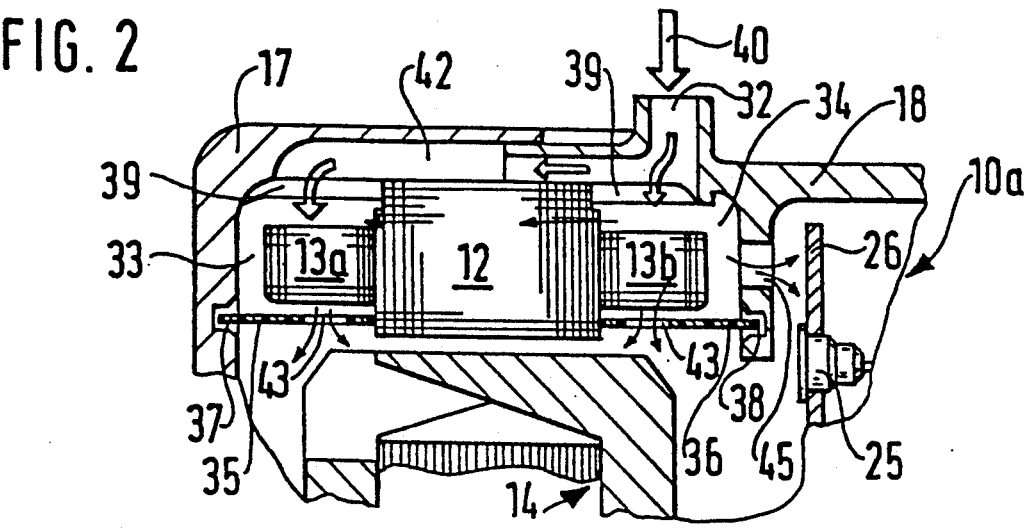
FIGS. 2 to 4 are detailed cutaway cross-sectional views through other embodiment examples of a three-phase generator according to the invention showing various cooling air connection pieces and cooling air branches from the air guiding ducts at the winding heads.
Figure 3:
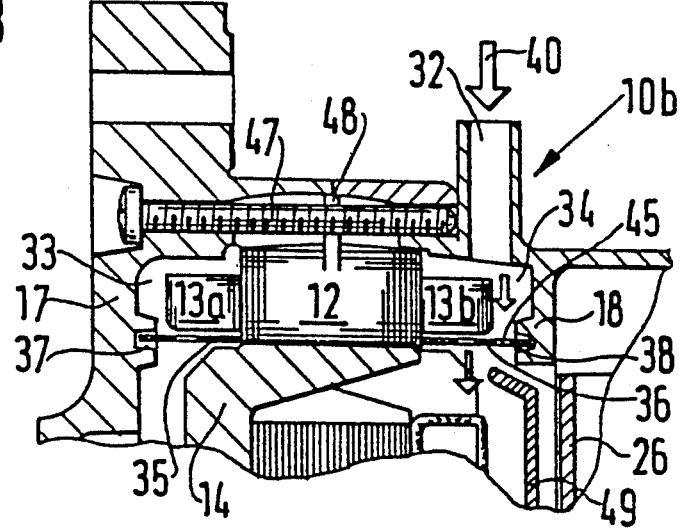
Figure 4:
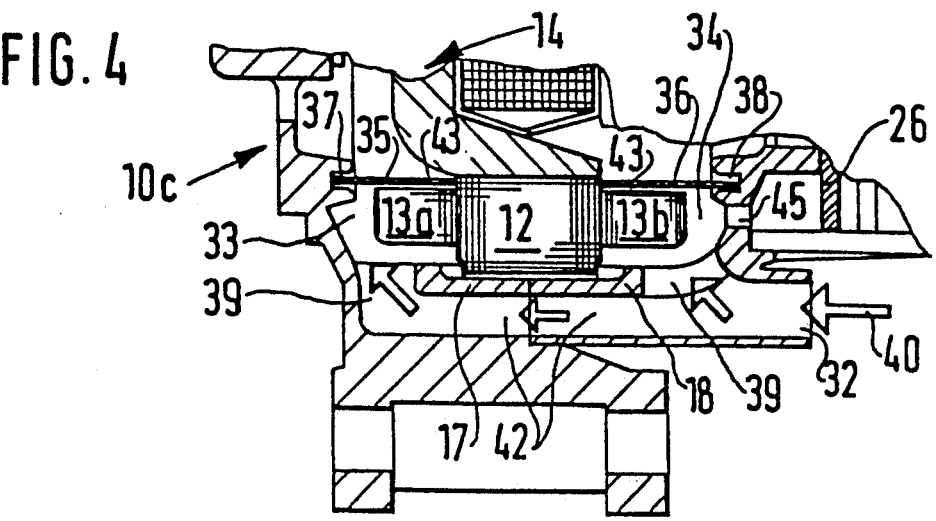

One embodiment example of a three-phase generator for motor vehicles is shown in FIGS. 1 to 4 as separately ventilated electric machine and is designated by 10. In subsequent figures provided with the same reference numbers. Whereas sections of the three-phase generator are shown in FIGS. 2, 3 and 4 with different embodiment forms of the separate ventilation, FIG. 1 shows the entire three-phase generator 10 in cross section. The generator 10 has a stator 11 having a lamination bundle 12 which carries a stator winding 13 and is received in a housing. The stator 11 cooperates magnetically with a claw pole rotor 14 which is fastened on a drive shaft 15 driven by the engine of the motor vehicle via a belt pulley 16. The generator housing has two cup-shaped housing halves 17, 18 constructed as end shields. The drive shaft 15 is supported on drive side A of the generator 10 in a sturdy bearing 19 which is inserted into the housing half 17 on the left-hand side, while a less sturdy bearing 20 receives the end of the drive shaft 15 on the brush side B of the generator 10. This bearing 20 sits in the right-hand housing half 18. Two collector rings 21 which connect electrically to an exciter winding 24 of the rotor 14 via a brush holder 22 and a regulator 23 are located at the end of the drive shaft 15. To rectify the three-phase current generated in the stator windings 13, rectifier diodes 25 are fastened on the front of the housing half 18 on the right-hand side in two cooling plates 26, 27 which are arranged one above the other in a sandwich arrangement and are held at a distance from one another by a printed circuit board 28 providing the circuitry of the rectifier diodes 25 and are screwed together by screws 29 at the front side of the right-hand housing half 18. The collector rings 21, brush holder 22, regulator 23 and rectifier arrangement 25 to 28 are covered by a dust-protection cap 30 on the B-side of the generator 10.

The generator 10 is supplied with cooling air via a hose 31 indicated in FIG. 1, the cooling air being produced separately in the fan or compressed air unit, not shown, arranged in the vehicle. The end of the hose 31 is placed on an air inlet connection piece 32 which is formed as part of the right-hand housing half 18. The winding heads 13a and 13b of the stator winding 13 at the two front sides of the lamination bundle 12 are bounded by annular air guiding ducts 33, 34 which are formed externally by the machine housing 17, 18 and in the vicinity of the rotor 14 by an annular wall 35 or 36 of plastic which is inserted between the lamination bundle 12 and the end shield area of the housing halves 17, 18. The two annular walls 35, 36 are received at the inside of the two housing halves 17, 18 by an annular groove 37, 38 arranged in the area of the end shields. Each of the two air guiding ducts 33, 34 has an inlet opening 39 for the cooling air flow indicated by arrow 40 and an outlet opening 41 on the opposite side. The air inlet connection piece 32 leads directly to the inlet opening 39 of the right-hand air guiding duct 34 and via an air feed duct 42 to the inlet opening 39 of the left-hand air guiding duct 33. The air feed duct 42 is formed by the two housing halves 17, 18 above the lamination bundle 12 as an extension of the air inlet connection piece 32. The two housing halves 17, 18 are screwed together and the lamination bundle 12 is clamped between them. To ventilate the rotor 14 with a smaller portion of the cooling air flow 40, the two annular walls 35, 36 below the winding heads 13a, 13b are provided with several apertures 43 in the area of the inlet openings 39 so that the cooling air reaching the rotor 14 can absorb the heat losses generated in it, particularly in the exciter winding 24, and is carried away via openings 44 in the bearing area of the housing. An additional opening 45 of the air guiding duct 34 located in the right-hand side of the generator 10 is provided on the right-hand side of the generator 10 for carrying away the heat losses in the regulator 23 and in the rectifier diodes 25. The heat losses are carried away to the outside after being absorbed by the cooling plates 26, 27 through venting slots 46 in the dust-protection cap 30. The air guiding ducts 33 and 34 are extended until close to the bearings by the annular walls 35 and 36 which are reduced in diameter conically toward the bearings 19 and 20, so that the heat losses generated in the bearings 19 and 20 first flow into the housing halves 7 and 18 and are carried away from there into the air guiding ducts 33, 34 by the cooling air.

As another embodiment example, FIG. 2 shows a cross section of the upper portion of a three-phase generator 10a for motor vehicles in which the air inlet connection piece 32 projects out radially and ends in the inlet opening 39 of the air guiding duct 34 in the right-hand side of the generator. The air feed duct 42 which leads directly over the lamination bundle 12 to the inlet opening 39 of the left-hand air guiding duct 33 branches off from the air inlet connection piece 32. The annular walls 35 and 36 with their apertures 43 below the winding heads 13a and 13b are not conically reduced as in FIG. 1, but rather, in this instance, are inserted in annular grooves 37, 38 arranged
directly below the winding heads 13a, 13b on the inside of the housing halves 17, 18.

The housing halves 17 and 18 of the generator are held together by a plurality of screws distributed along the circumference. Such a screw 47 of the upper portion of a three-phase generator 10b shown in cross section can be seen in FIG. 3. The lamination bundle 12 has a stronger lamination in the center having outwardly directed lugs 48 in the region of the screws 47 through which the screws 47 pass and which are clamped in and centered between the housing halves 17 and 18. Air feed ducts from the right-hand air guiding duct 33 to the left-hand air guiding duct 34 cannot be seen here, since they are formed in the housing halves 17 and 18 as seen in the circumferential direction or from behind the screws 47. Moreover, additional openings 45 for venting the rectifier diodes are provided in the right-hand annular wall 35. The cooling air emerging from the latter is directed over an air guiding plate 49 to the cooling plate 26 of the rectifier diodes which cannot be seen here.

The embodiment example shown in FIG. 4 shows a three-phase generator 10c in cross section with an axial cooling air feed at the underside of the machine.

Figure 5:
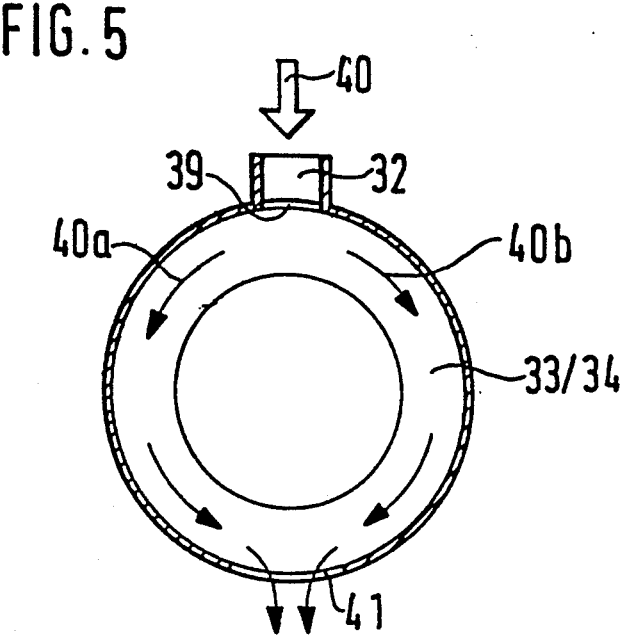
FIGS. 5 to 9 are detailed cutaway cross-sectional views through a three-phase generator for a motor vehicle according to the invention showing air guiding ducts at the winding heads of electric machines with different air inlet and air outlet openings.

The air guiding ducts 33 and 34 of the generator 10 are shown schematically in FIGS. 5 to 8 with different inlet and outlet openings. FIG. 5 shows an air guiding duct 33 or 34 with an air inlet connection piece 32 at the upper inlet opening 39 and an oppositely located outlet opening 41. The cooling air flow 40 is divided in this instance at the inlet opening 39 of the air guiding duct 32 and 33 into two identical parts 40a, 40b which cool one half of the winding head enclosed by them and carry away to the outside the absorbed heat at the common outlet opening 41 arranged below. If the inlet opening 39 and outlet opening 41 are arranged offset by less than 180 degrees relative to one another rather than symmetrically due to installation conditions, it must be ensured by a corresponding design of the inlet opening 39 that the cooling air flow 40 is divided into corresponding different branch flows 40a, 40b.

Figure 6:
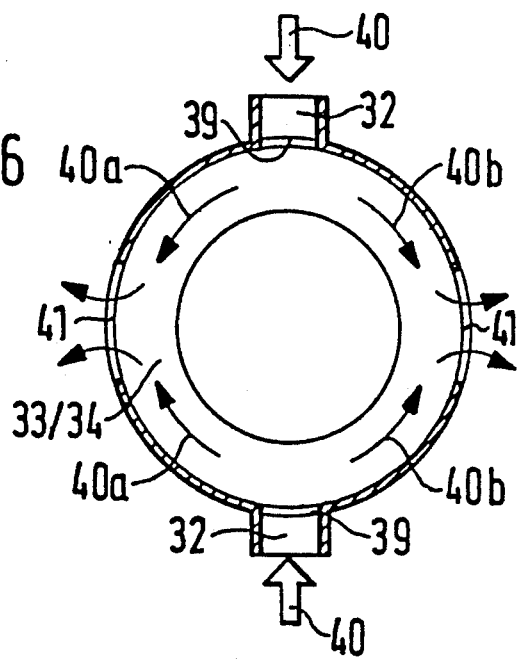

FIG. 6 shows a solution in which the cooling air flow 40 reaches the air guiding duct 33 and 34 through two inlet openings 39 situated opposite one another, is divided into partial flows 40a and 40b, and is then carried away to the outside at two outlet openings 41 which are likewise situated opposite one another. The outlet openings 41 are arranged between the inlet openings 39 at the outer circumference of the air guiding duct 33, 34 in this instance.

Figure 7:
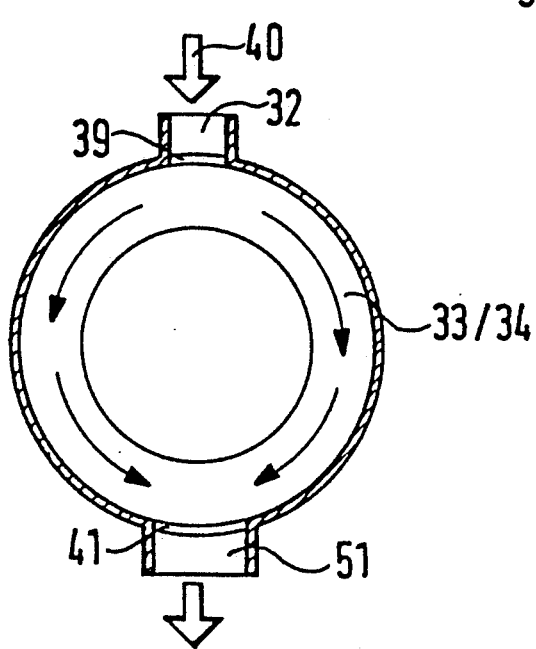

FIG. 7 shows that an air inlet connection piece 32 is formed on at the inlet opening 39 of the air guiding duct 33, 34 and a connection piece 51 for carrying away the air is formed on at the outlet opening 41. A connection hose can be connected to the connection piece 51, for example for defrosting the windshield or for heating the passenger compartment. The heated air can be removed from the air guiding duct via this connection piece 51 by an additional blower.

Figure 8:
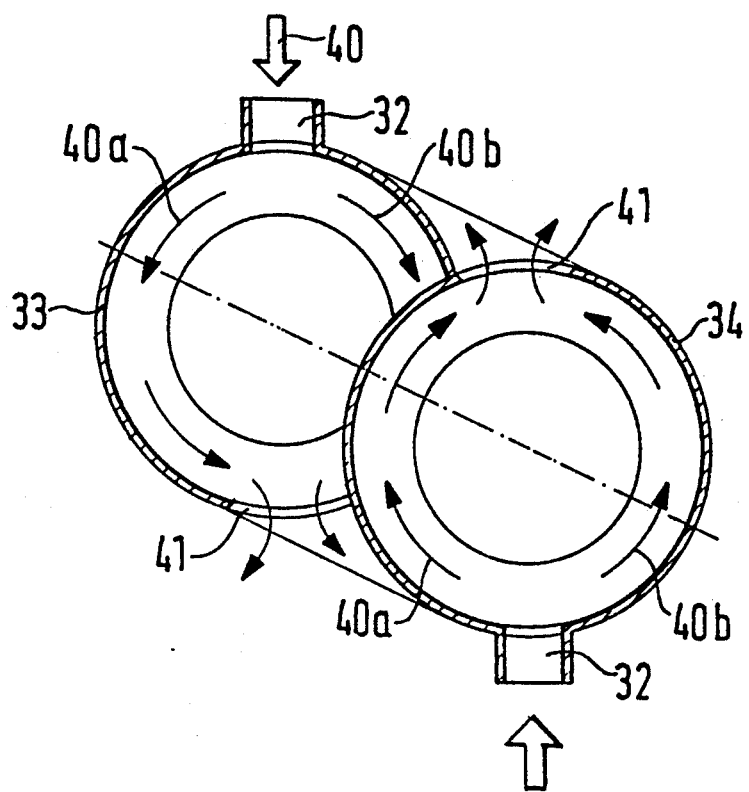

FIG. 8 shows that cooling air flows through the two air guiding ducts 33 and 34 in the opposite direction. The air inlet opening 39 of the front air guiding duct 34 is situated at the bottom and that of the rear air guiding duct 34 at the top. The outlet openings 41 of the two air guiding ducts 33 and 34 are offset by 180 degrees relative to one another in this instance as well. Accordingly, the stator winding of the machine can be cooled, as a whole, more uniformly and accordingly more effectively since the winding parts in the lower area of the machine at the winding head can be cooled more intensively in the front air guiding duct 34 than in the rear air guiding duct 33 and, conversely, the upper winding parts at the winding head can be cooled more intensively in the rear air guiding duct 33 than in the front air guiding duct 34. Since the heat losses produced in the stator winding are more intensive toward the more intensively cooled winding head ends, the winding temperature in the area of the outlet openings 41 of the air guiding ducts 33 and 34 drops to lower values so that the effectiveness of the cooling is accordingly substantially increased. The cooling air feed can be realized outside the machine by two connection hoses or by a hose branch. It is likewise possible to construct the two inlet openings 39 of the air guiding ducts 33 and 34 by means of a connection duct in the housing of the machine.

Figure 9:
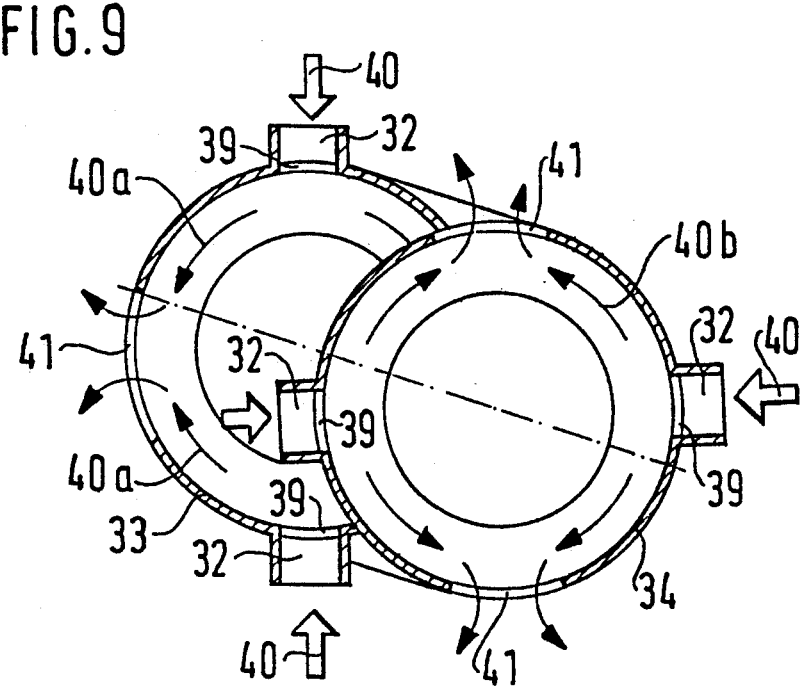

FIG. 9 shows a solution which is modified compared to FIG. 8 having two inlet and outlet openings 32 and 41, respectively, per air guiding duct 33, 34 which are offset by 90° relative to one another. The winding temperature is additionally reduced in the area of the outlet openings 41 compared to the solution according to FIG. 6.

The invention is not limited to the shown embodiment examples for three-phase generators in motor vehicles, but can be realized generally in rotary electric machines. A pressure fan or a compressed air unit driven by the combustion engine or by an electric motor can be used to generate cooling air. The air is guided via one or two hoses to the air guiding ducts of the electric machine with or without filtering. Further it is possible to mount a pressure fan or suction ventilator directly on the drive shaft of the electric machine.

Moreover, the cooling air can also be directed via a plurality of air feed ducts from one air guiding duct to the other air guiding duct by an appropriate construction of the housing. The connection pieces for the air cooling of the machine can be used both for the compressed air cooling with overpressure as well as for suction air cooling with a vacuum. Since the housing surface of the machine is substantially closed, the construction is protected against spraying water and from corrosion. Further it is possible to arrange an air guiding duct on only one side of the machine around the winding head and to guide the cooling air from this air guiding duct via axial cooling ducts constructed in the housing above the stator lamination bundle as well as through grooves of the lamination bundle which are not completely filled by the stator winding. The heat losses can then be carried away from the warmest places in the lamination bundle of the machine to the other side and from there out into the atmosphere. It is likewise possible to provide air guiding ducts with different cross sections at the two winding heads of the machine and accordingly to produce an axial flow component of the cooling air flow through the lamination bundle when the grooves of the lamination bundle are not filled, resulting in a further improvement of the efficiency of the cooling system. To provide additional cooling for additional sources of heat inside the electric machine, it is necessary that the arrangement and construction of the additional openings and apertures in the air guiding ducts required for this purpose be determined for each instance.

A good efficiency of the cooling system can be achieved by carrying away heat produced substantially in the stator winding of the machine directly by the air guiding ducts so that cooling air generators of relatively small dimensions can be used. This results in a reduction of the aerodynamic machine noise and in an increase in the permissible loading of the machine or in smaller dimensions of the machine with the same output.

While the invention has been illustrated and described as embodied in an electric machine with means for guiding cooling air supplied from outside of the machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letter Patent is set forth in the appended claims.

I claim:

1. Electric machine having an exterior and an interior and provided with means for guiding cooling air from the exterior, said electric machine comprising a machine housing including two housing halves (17,18), each of said housing halves acting as an end shield, a lamination bundle (12) provided with a stator winding (13) having winding heads (13a, 13b), said lamination bundle (12) and said stator winding (13) being clamped in the machine housing between the housing halves, and a rotor (14) mounted in the machine housing to cooperate magnetically with the lamination bundle (12), wherein the machine housing is provided with at least one air guiding duct (33,34) circumferentially disposed about at least one of the winding heads (13a, 13b) of the stator winding (13) on one side of the lamination bundle and the at least one air guiding duct (33,34) is provided with at least one inlet opening (30) for admission of cooling air from the exterior and at least one outlet opening (40) for expulsion of the cooling air to carry away heat dissipated during operation, and each of the at least one air guiding ducts (33,34) is bounded exteriorly by one of the housing halves of the machine housing and interiorly by one of two annular walls (35,36) inserted between the lamination bundle (12) and the housing half bounding the at least one air guiding duct (33,34) exteriorly, and wherein an annular groove (37,38) is provided in an inside surface of each of the housing halves (17,18) to receive one of the annular walls (35,36) and said at least one winding head (13a, 13b) extends in said at least one air guiding duct so as to be exposed to the cooling air in said at least one air guiding duct.

2. Electric machine according to claim 1, wherein the housing halves (17,18) extend over the lamination bundle (12) and are screwed together in an air-tight manner to form two of said at least one air guiding ducts (33,34) and an air feed duct (42) connected to each of the two air guiding ducts (33,34).

3. Electric machine according to claim 2, further comprising an air inlet connection piece (32) connected to the air feed duct (42) and located in the vicinity of one (34) of the air guiding ducts (32,34), the air feed duct (42) leading from the air guiding duct located in the vicinity of the air inlet connection piece (32) to the other air guiding duct (33).

4. Electric machine according to claim 1, wherein the annular walls (35,36) between the housing halves and the lamination bundle (12) are provided with apertures (43) for admission of the cooling air to the rotor (14) for cooling the rotor.

5. Electric machine according to claim 2, wherein each of the air guiding ducts (33,34) has one of the air outlet openings and one of the air inlet openings and the air outlet opening for each of the air guiding ducts is located opposite to the air inlet opening.

6. Electric machine according to claim 5, wherein at least one of the two housing halves (17,18) has a vacuum connection piece (51) for one of the air outlet openings at an outer circumference of one of the air guiding ducts.

7. Electric machine according to claim 1, wherein each of the air guiding ducts (33,34) have tow of the air inlet openings (39) located opposite each other and two of the air outlet openings (41) also located opposite each other.

8. Electric machine according to claim 5, wherein the air inlet opening (39) of one of the air guiding ducts (33) is offset by 180° relative to the air inlet opening (39) of the other air guiding duct (34).

9. Electric machine according to claim 5, wherein the air outlet opening (41) of one of the air guiding ducts (33) is offset by 180° relative to the air outlet opening (41) of the other air guiding duct (34).

10. Electric machine according to 1, further comprising a plurality of rectifier diodes (25) having cooling plates (26,27) attached to one of the housing halves (17.18) provided with at least one additional opening (45) communication with one of the at least one air guiding ducts (33,34) to supply the cooling air to the rectifier diodes.

* * * * *